(12) United States Patent
Takahashi et al.

(10) Patent No.: US 7,027,266 B2
(45) Date of Patent: Apr. 11, 2006

(54) HEAD SUSPENSION WITH FLEXURE-SUPPORTED SLIDER BETWEEN FIRST AND SECOND LOAD BENDING PORTIONS

(75) Inventors: Haruhide Takahashi, Odawara (JP); Shigeo Nakamura, Odawara (JP); Hideaki Tanaka, Odawara (JP)

(73) Assignee: Hitachi Global Storage Technologies Japan, Ltd., Odawara (JP)

( * ) Notice: Subject to any disclaimer, the term of this patent is extended or adjusted under 35 U.S.C. 154(b) by 201 days.

(21) Appl. No.: 10/295,351

(22) Filed: Nov. 15, 2002

(65) Prior Publication Data

US 2003/0193752 A1    Oct. 16, 2003

(30) Foreign Application Priority Data

Apr. 16, 2002  (JP)  ............................. 2002-112817

(51) Int. Cl.
*G11B 5/48* (2006.01)
*G11B 21/16* (2006.01)

(52) U.S. Cl. ............................. 360/244.8; 360/244.2; 360/246.6

(58) Field of Classification Search ............. 360/244.8, 360/246.6, 246.8, 234.6, 244.2, 244.1
See application file for complete search history.

(56) References Cited

U.S. PATENT DOCUMENTS

| | | | | |
|---|---|---|---|---|
| 5,065,268 A | * | 11/1991 | Hagen ..................... | 360/244.8 |
| 5,541,789 A | * | 7/1996 | Fukuoka et al. ......... | 360/246.2 |
| 5,710,680 A | * | 1/1998 | Bucska et al. ........... | 360/246.6 |
| 5,835,307 A | * | 11/1998 | Sone ....................... | 360/244.9 |
| 5,898,543 A | * | 4/1999 | Jagt et al. ............... | 360/244.8 |
| 6,084,746 A | * | 7/2000 | Shiraishi et al. ......... | 360/244.1 |
| 6,369,986 B1 | * | 4/2002 | Coon ...................... | 360/244.9 |
| 6,392,843 B1 | * | 5/2002 | Murphy ................... | 360/244.8 |

FOREIGN PATENT DOCUMENTS

JP    2000-173215    6/2000

OTHER PUBLICATIONS

*Patent Abstracts of Japan*, Japanese Patent Publication No. 2000-173215 (Published: Jun. 23, 2000) entitled *Magnetic Disk Device*, 2 pages total.
Suyama, Hideo, *IDEMA Japan News*, No. 46 (Aug. 2001) pp. 20-23.
English Translation of Suyama, Hideo, *IDEMA Japan News*, No. 46, (Aug. 2001) pp. 20-23, entitled *New Structure Slider/Suspension*, Head/Test Subcommittee (Aug. 2001), Engineering Committee, pp. 1-14.

* cited by examiner

*Primary Examiner*—Craig A. Renner
(74) *Attorney, Agent, or Firm*—Townsend and Townsend and Crew LLP

(57) ABSTRACT

The present invention provides an improved suspension and head assembly. One exemplary suspension comprises an arm configured to be held by a positioning mechanism. A first load beam is coupled to the arm. A first flexure is coupled to the first load beam. The suspension comprises a first load bending portion and a second load bending portion. The head assemblies of the present invention can include a suspension that can carry a first slider and a second slider. The first slider can reproduce information of a medium.

7 Claims, 16 Drawing Sheets

HEAD SUSPENSION WITH FLEXURE-SUPPORTED SLIDER BETWEEN FIRST AND SECOND LOAD BENDING PORTIONS

CROSS REFERENCE TO RELATED APPLICATIONS

The present application claims priority to Japanese Patent Application JP 2002-112817, filed Apr. 16, 2002.

BACKGROUND OF THE INVENTION

The present invention generally relates to suspensions, head assemblies, and disk drives. More specifically, the present invention relates to methods for making impact resistance and atmospheric pressure dependency of a slider compatiable with each other.

FIG. 10 shows an example of a conventional suspension and head assembly. The head assembly includes a slider 4 attached to a flexure 3 on a gimbal side of the head assembly. A load beam 2 is bent at a load bending portion 5 and carries slider 4 and flexure 3. Load beam 2 applies a press load to slider 4 to maintain the slider at a predetermined flying height.

To increase a magnetic recording density it is important to reduce a flying height of a slider and reduce a dispersion of the flying height to a predetermined range.

The dispersion in flying height is caused by a dispersion in the press load, which is primarily dependent on a dispersion in the attachment height of the suspension and an elastic rigidity of the suspension. Specifically, the relationship between the dispersion in the press load and the dispersion of the attachment height is as follows: (Dispersion in Press Load)=(Dispersion in Height of Attachment of Suspension Relative to a Surface of the Magnetic Disk)*(Elastic Rigidity of Suspension).

To reduce the dispersion in the press load (and to reduce the dispersion in the flying height) either the dispersion in the attachment height or the elastic rigidity of the load beam must be reduced. Since it is difficult to reduce the dispersion in the attachment height during assembly of the disk apparatus, the elastic rigidity of the load beam should be reduced. However, reduction of the elastic rigidity of the suspension and increases the likelihood of premature plastic deformation of the suspension due to the repeated loading and unloading of the load arm.

Damage to the data on the disk is typically caused by a shock impact which causes the slider to hit the magnetic disk surface. In order to promote the impact resistance of the suspension and head assembly, that is, restrain the slider from moving from its flying height and hitting the surface of the magnetic disk, it has been effective to reduce the equivalent mass of the suspension assembly and increase the press load on the slider. Unfortunately, when the press load is increased the flying height dependency on atmospheric pressure is deteriorated. Moreover, reducing the equivalent mass of the suspension assembly also reduces the press load, which detrimentally effects the impact resistance of the suspension.

One head assembly that attempts to resolve the above problems is illustrated in FIG. 11. A second, dummy slider 14 which does not record or reproduce information is located on the load beam 2 distal of slider 4. A large press load is applied to slider 14 while a smaller press load is applied to the slider 4 to promote the shock resistance of the suspension. Unfortunately, the load beam 2 that applies a larger press load to the dummy slider 14 is enlarged and has an increased equivalent mass. Consequently, with such designs it has proven difficult to improve the impact resistance of the head assembly.

Further, when a magnetic disk drive positions the head assembly with a, positioning mechanism of a rotary type (rotational type or swinging type), because the dummy slider 14 is distal of slider 4, there is an interference with a disk clamp or a disk spacer when accessing an innermost data area on an inner periphery of a surface of a magnetic disk. Consequently, the innermost area of the magnetic disk cannot be used for data recording. Additionally, when second slider 14 reaches an outermost data area of the magnetic disk, slider 4 will not be positioned on the outermost data area. Therefore, the outermost data area of the magnetic disk cannot be used for data recording and the overall data area for the magnetic disk is narrowed.

BRIEF SUMMARY OF THE INVENTION

As means for resolving the above-described problem, the present invention provides improved suspension and a head assemblies.

In a first aspect, the present invention provides a suspension comprising an arm that is configured to be held by a positioning mechanism. A load beam can be coupled to the arm. The load beam can have a first flexure directly or indirectly attached (e.g., coupled) to the load beam. The suspension has a first load bending portion and a second load bending portion between the arm and the first, flexure.

In another aspect, the present invention provides a suspension. The suspension includes an arm that is configured to be held by a positioning mechanism. A first load beam is coupled to the arm. A first flexure and a second flexure are coupled to the first load beam, wherein the suspension comprises a first load bending portion between the first flexure and the arm.

In another aspect, the present invention provides a head assembly that includes an arm that is configured to be held by a positioning mechanism. A first load beam can be coupled to the arm. A first slider can be coupled to the first load beam. The first slider has a transducer that reproduces information from a medium. A second slider can be positioned between the first slider and the positioning mechanism. The head assembly comprises a first load bending portion and a second load bending portion that are between the arm and the first slider.

In exemplary embodiments, the first load bending portion is between the first slider and the second slider and applies a first load to the first slider, and the second load bending portion is between the second slider and the arm and applies a second load to the second slider.

For a further understanding of the nature and advantages of the invention, reference should be made to the following description taken in conjunction with the accompanying drawings and claims.

DETAILED DESCRIPTION OF THE INVENTION

Figure 1:
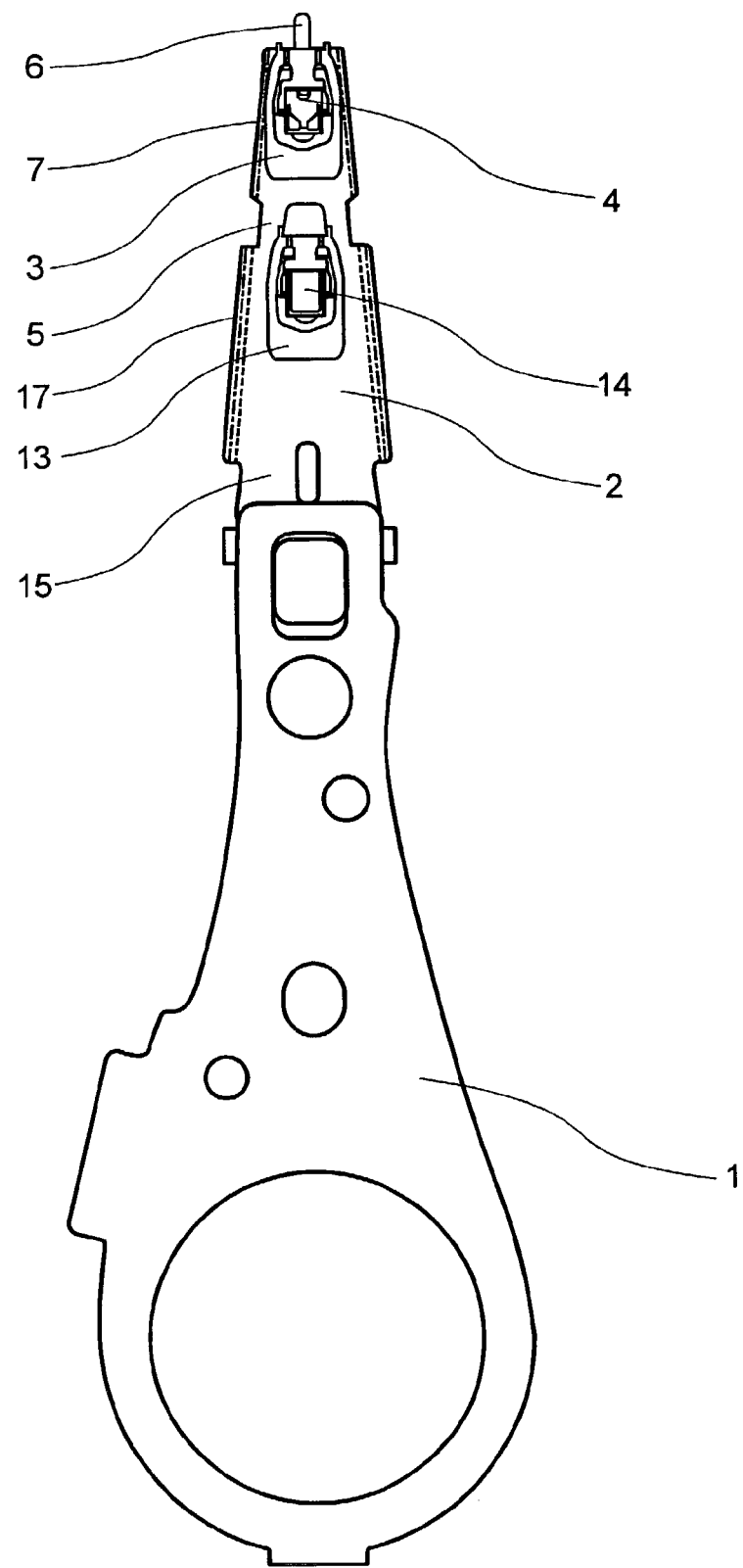
FIG. 1 is a plan view of a head assembly according to the present invention.
Figure 2:
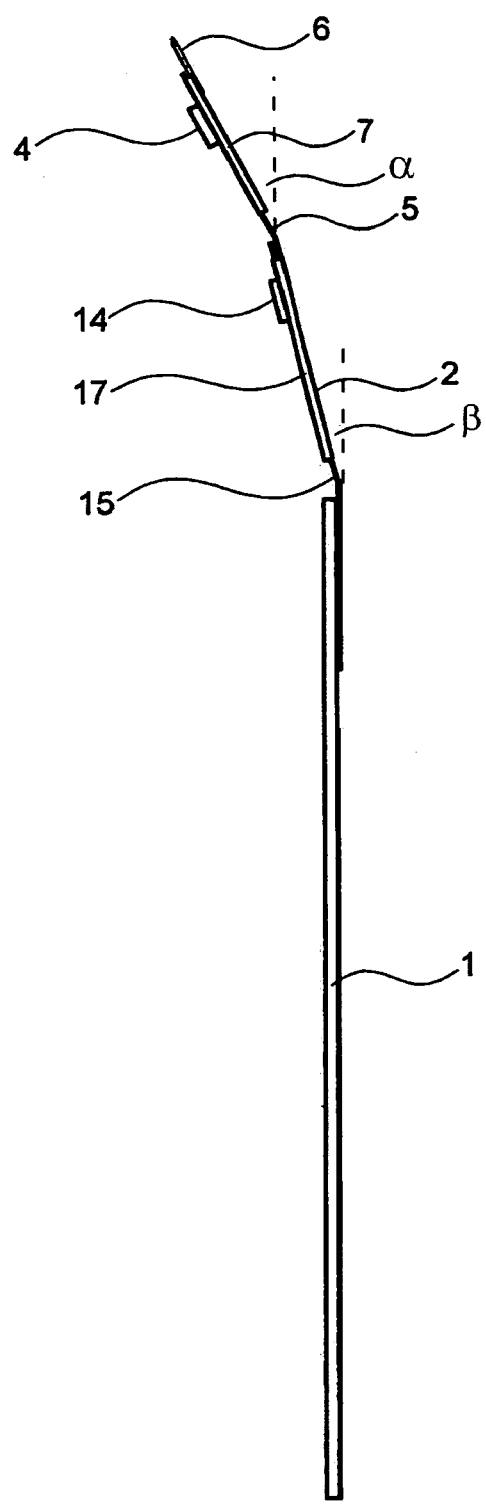
FIG. 2 is a side view of the head assembly according to the invention of FIG. 1.
Figure 7:
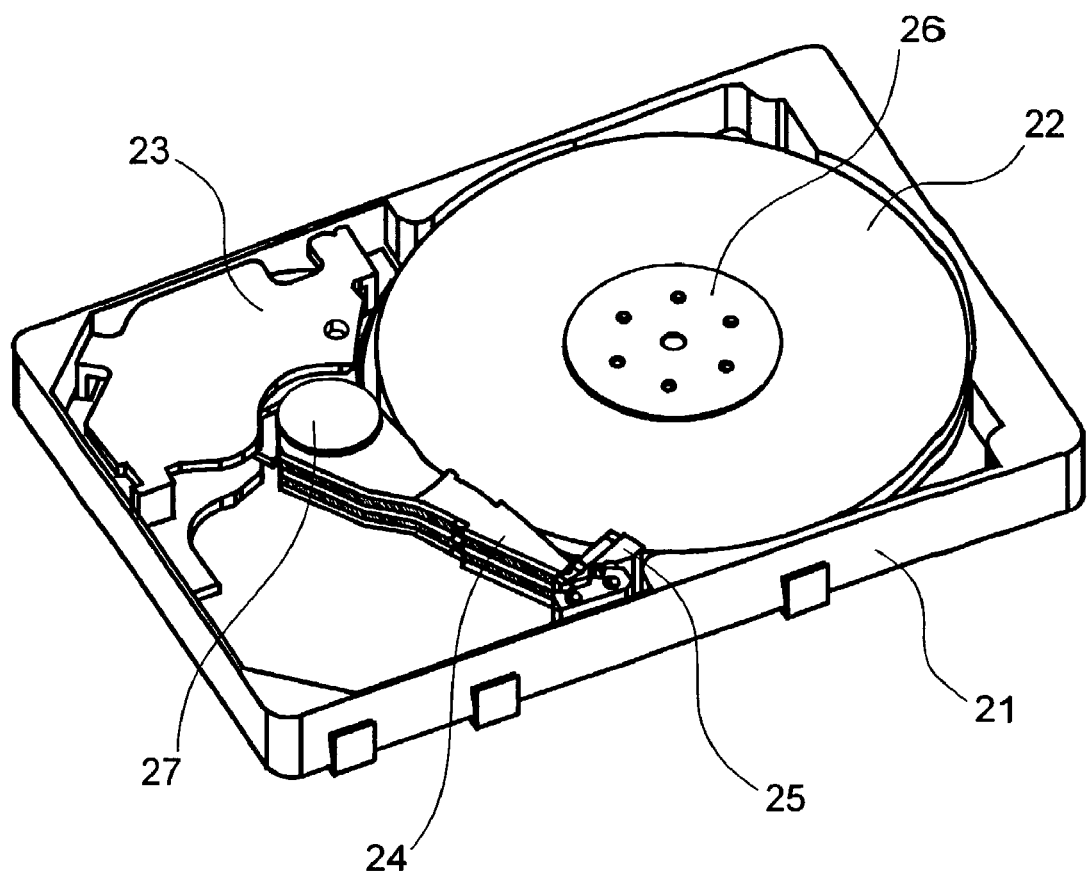
FIG. 7 is a perspective view of a magnetic disk drive according to the present invention.

FIG. 1 shows a plan view of a head assembly of a magnetic disk drive according to one exemplary embodiment of the present invention, when viewed from a magnetic disk. Further, FIG. 2 shows a side view of the head assembly of FIG. 1. FIG. 7 is a view of a magnetic disk drive that can carry the head assembly of the present invention. As used in the specification herein, a suspension includes an arm, a load beam, and one or more flexures. Also, as used in the specification herein, the head assembly includes a transducer, a first slider, a second slider, and the suspension.

In operating the magnetic disk drive of the present invention, a first slider 4 and second slider 14 can be attached to a contact side of the head assembly and fly above a surface of the rotating magnetic disk 22. When the magnetic disk 22 rotates, an air flow pressure is created between the sliders 4, 14 and the magnetic disk surface 22. A transducer having a magnetoresistive element on the first slider 4 records information to the magnetic disk or reproduces information from the magnetic disk. The suspension 24 applies a press load to both the first slider 4 and the second slider 14. The press load can be balanced by the air flow pressure to maintain a flying height between sliders 4, 14 and the magnetic disk 22.

According to one embodiment of the suspension 24 of the present invention, a proximal end of a load beam 2 is attached to a distal end of arm 1 by a welding or other conventional means. The other, proximal end of the arm 1 is attached to a portion of a positioning mechanism portion 23 of the magnetic disk drive. The arm 1 is fixed to a base 21 via a rotatable pivoting shaft 27. The positioning mechanism portion 23 can position the first slider 4 by rotating the arm 1 around the pivoting shaft 27.

The magnetic disk drive is provided with a load/unload mechanism that includes a tab 6 attached to the head assembly that can interact with a ramp 25. Positioning mechanism portion 23 moves the transducer (e.g., magnetic head) above the magnetic disk 22 when information is recorded or reproduced. To prevent damage when information is not recorded or reproduced, the positioning mechanism portion 23 unloads head assembly from the magnetic disk 22 to separate the transducer from the magnetic disk. When the head assembly unloads, the tab 6 engages ramp 25 so as prevent the transducer from contacting ramp 25 and magnetic disk surface 22.

A detailed explanation will be given of the suspension and head assembly according to the invention in relation to FIGS. 1–5B.

As shown in FIG. 1, the first slider 4 is attached to a distal end of the load beam 2 with a flexure 3. A gimbal, which is part of flexure 3 maintains first slider 4 and typically allows first slider 4 to rotate about at least two axes. A first load bending portion 5 applies a first press load to the first slider 4. A second load bending portion 15 applies a press load to the second slider 14. A lift tab 6 for loading/unloading is adjacent the first slider 4 at the distal end of the suspension.

Second slider 14 is attached to the load beam 2 between the first slider 4 and the arm 1. The second slider 14 is attached to a second gimbal, which is part of second flexure 13, that can allow second slider 14 to rotate about at least two axes. In exemplary embodiments, the first slider 4 is provided with a transducer for recording information to the magnetic disk 22 and reproducing information from the magnetic disk 22. In contrast, the second slider 14 is not provided with a transducer for recording or reproducing information. Because the second slider 14 does not have a transducer, the flying height of the second slider 14 can be higher than the flying height of the first slider 4. Since the slider 14 has a higher flying height, dispersions in the flying height and press load are more allowable in the second slider 14 than in the first slider 4.

Therefore, the second load bending portion 15 is typically made slightly more rigid in comparison with the first load bending portion 5. Consequently, the second slider 14 is applied with a press load that is larger than the press load applied to the first slider 4. For example, the press load applied to the second slider 14 can be equal to or larger than 5 gf so as to make the second slider 14 stable. The stabilized slider 14 will prevent sliders 4, 14 from jumping and contacting the magnetic disk surface 22 in the event of an impact force on the disk drive.

The first and second load bending portions 5, 15 between the arm 1 and the first slider 4 can substantially compensate for a dispersion in height of the suspension attaching portion. The presence of the second load bending portion 15 on the head assembly can compensate for the changes in the loads on the suspension due to the dispersion in the attachment height of the suspension attaching portion. As a result, a dispersion in a flying height of the first slider 4 can also be reduced.

Because the second slider 14 is applied with a high press load and does not jump from the disk surface, only the mass distal of slider 14 may be taken into account when measuring an equivalent mass of the suspension. Since the equivalent mass of the suspension is reduced, the press load necessary for ensuring the impact resistance of slider 4 can be reduced. Therefore, atmospheric pressure dependency can also be improved.

As shown in FIGS. 1 and 2, the first bending portion 5 defines a first bend angle ($\alpha$) in the load beam 2 on the gimbal side. The second bending portion 15 defines a second bend angle ($\beta$) in the load beam 2. In exemplary embodiments, the first bend angle is different from the second bend angle. Typically, the first bend angle is larger than the second bend angle. It should be appreciated however, that in other embodiments, the first bend angle and second bend angle can be the equal to each other or the second bend angle can be larger than the first bend angle.

As shown in FIGS. 1 and 2, load beam 2 can have a first formed rail or flange 7 and a second formed rail or flange 17 to provide rigidity to the load beam. In one embodiment, first flange 7 is bent away from first slider 4 and away from a gimbal side of the suspension to prevent contact of the flange 7 with the magnetic disk surface 22. Second flange 17 can be bent toward second slider 14 on the gimbal side of the suspension and toward magnetic disk surface 22 to reduce the thickness or height of the head assembly.

Figure 3A:
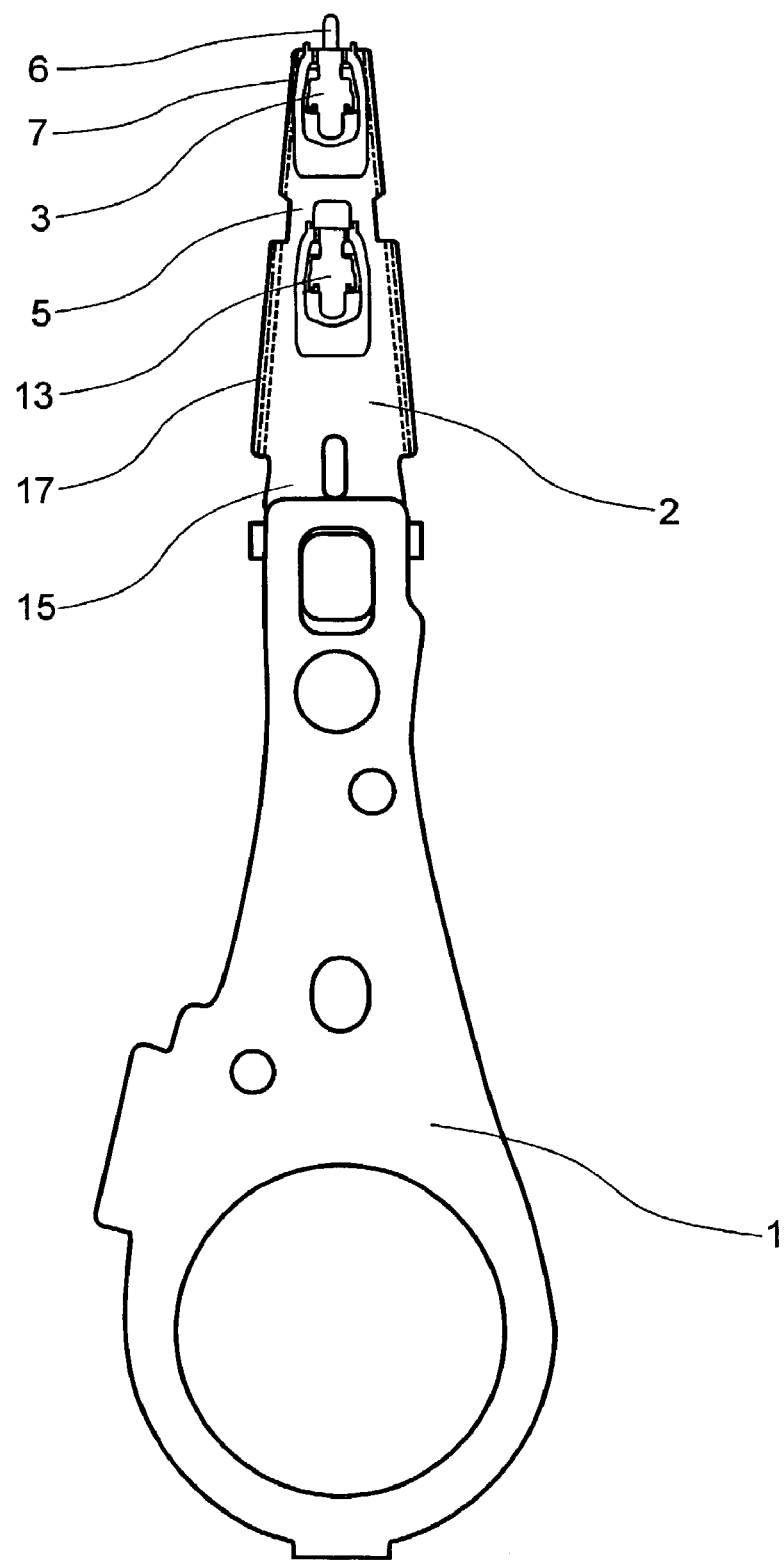
FIG. 3A is a plan view of a suspension according to the present invention.
Figure 3B:
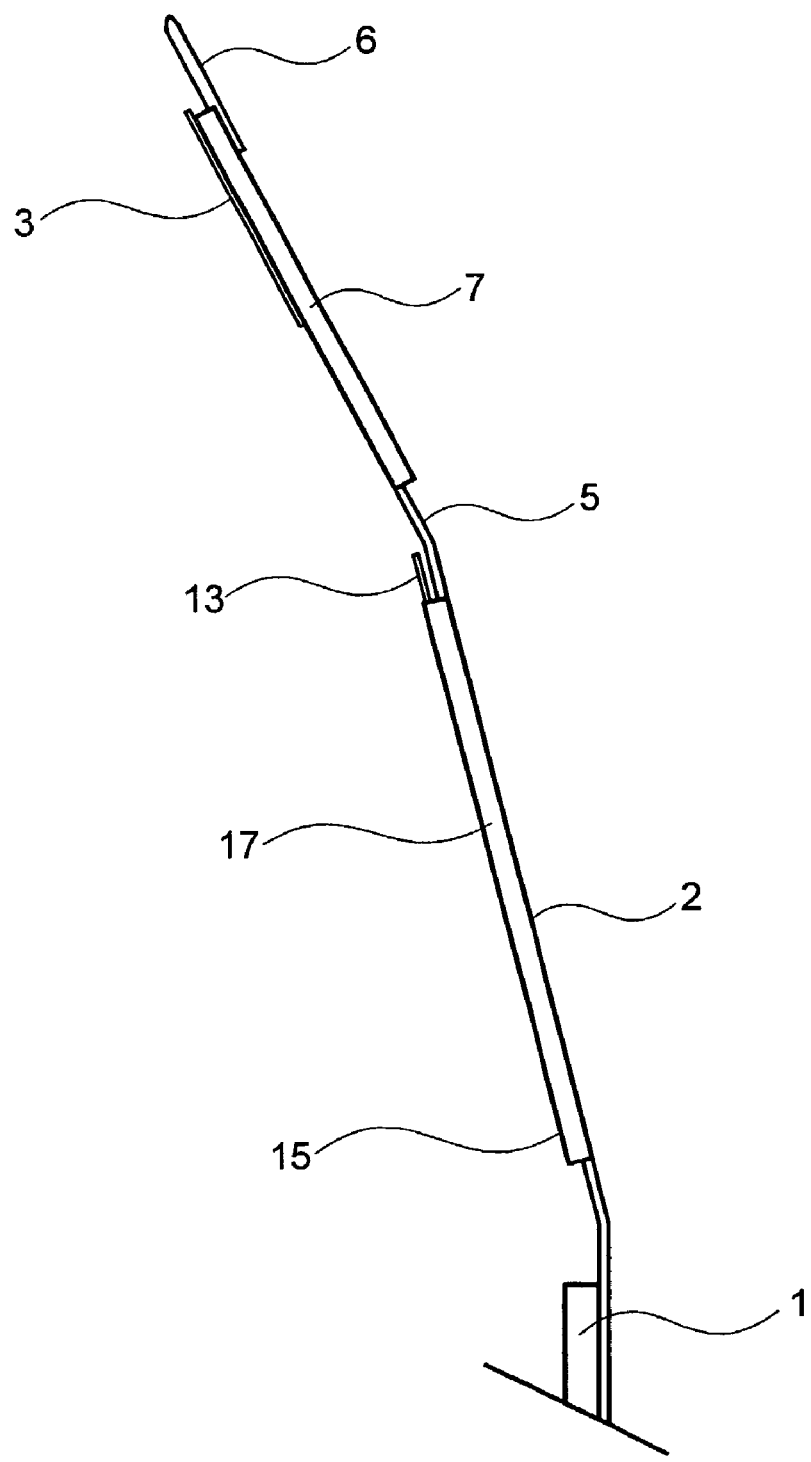
FIG. 3B is a side view of the suspension according to the invention of FIG. 3A

FIGS. 3A and 3B shows one embodiment of a suspension according to the present invention. The suspension assembly 24 comprises arm 1, load beam 2 that has first flange 7 and second flange 17, first flexure 3 and second flexure 13, first load bending portion 5 and second load bending portion 15, and tab 6.

The first bending portion 5 applies a low press load to the first flexure 3 that is attached with slider 4 on a gimbal side of the suspension for recording and reproducing information. A gimbal rigidity of the flexure 3 is made to be sufficiently small in order to reduce the dispersion in the flying height. Meanwhile, a dispersion in the flying height for the slider 14 attached with the second flexure 13 is permitted. Therefore, the second load bending portion 15 uses an elastic rigidity that is larger than the first load bending portion 5 to apply a press load that is larger than the first load bending portion 5.

Since the second slider 14 does not chase the surface of the magnetic disk to the same degree as the first slider 4, the gimbal rigidity of the second flexure 13 is permitted to be larger (e.g., more rigid) than the first flexure 3. Therefore, the second flexure 13 will improve the positioning characteristics and load/unloading characteristics of the slider 14. Consequently, slider 4 can be more accurately positioned over the data areas of the magnetic disk.

Although not illustrated, the first flexure 3 can be formed with a wiring pattern for transmitting a signal from the transducer on first slider 4. It is not necessary, however, for the second flexure 13 to form a pattern since there is no transducer on the second flexure 13.

Figure 11:
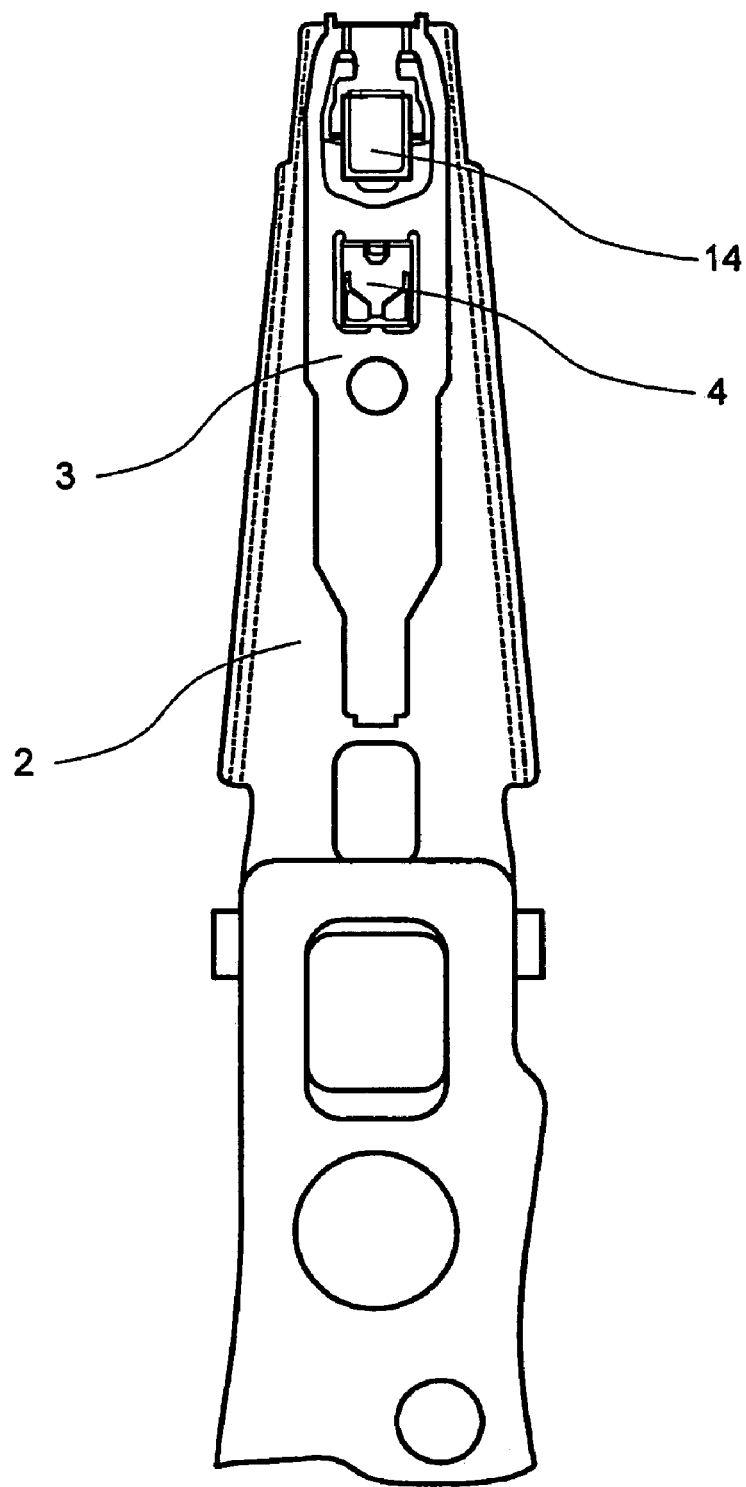
FIG. 11 is a plan view of another conventional head assembly.

According to the example shown in FIG. 11, in conventional head assemblies, a single flexure is used for the two sliders. With such a design, there is a possibility that the flexure formed with the wiring pattern is enlarged and the costs are increased. According to the embodiments of the present invention, two flexures 3, 13 are used and costs can be reduced by optimizing the respective plate thicknesses and reducing the size and shape of the flexure 3 formed with the wiring pattern.

Figure 6:
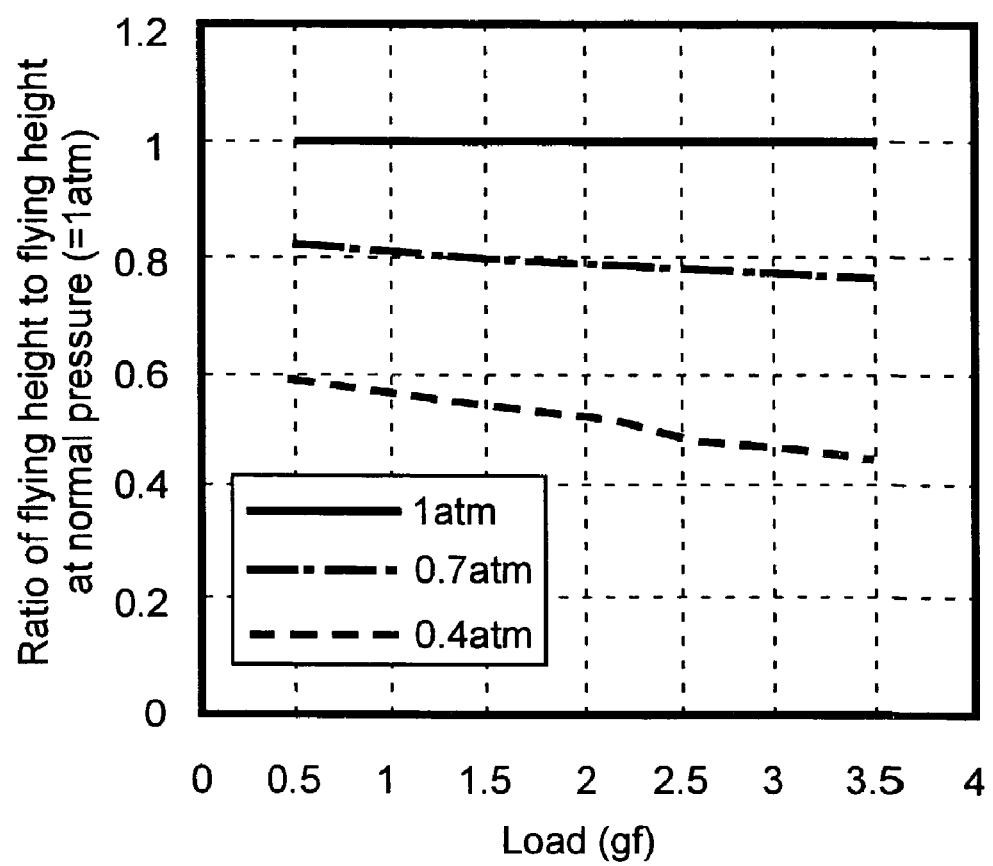
FIG. 6 is a graph showing an atmospheric pressure dependency of a flying height by press load.

FIG. 6 is a graph that shows an atmospheric pressure dependency of a flying height relative to press load. The ordinate (horizontal axis) designates a press load and the abscissa (vertical axis) designates a ratio of a flying height to a flying height at normal pressure (1 atm). When the press load is increased to improve the impact resistance, the atmospheric pressure dependency and a reduction in flying height in a low pressure environment (e.g., high altitude) is deteriorated. In other words, when the press load is increased a change in a flying height at low pressure is increased. Therefore, achieving high shock resistance at low press load is preferable. According to the embodiments of the present invention, the first slider 4 can provide impact resistance at a relatively low press load because of the high press load applied to the second slider 14. As a result, the atmospheric pressure dependency of the flying height can also be improved.

Figure 8A:
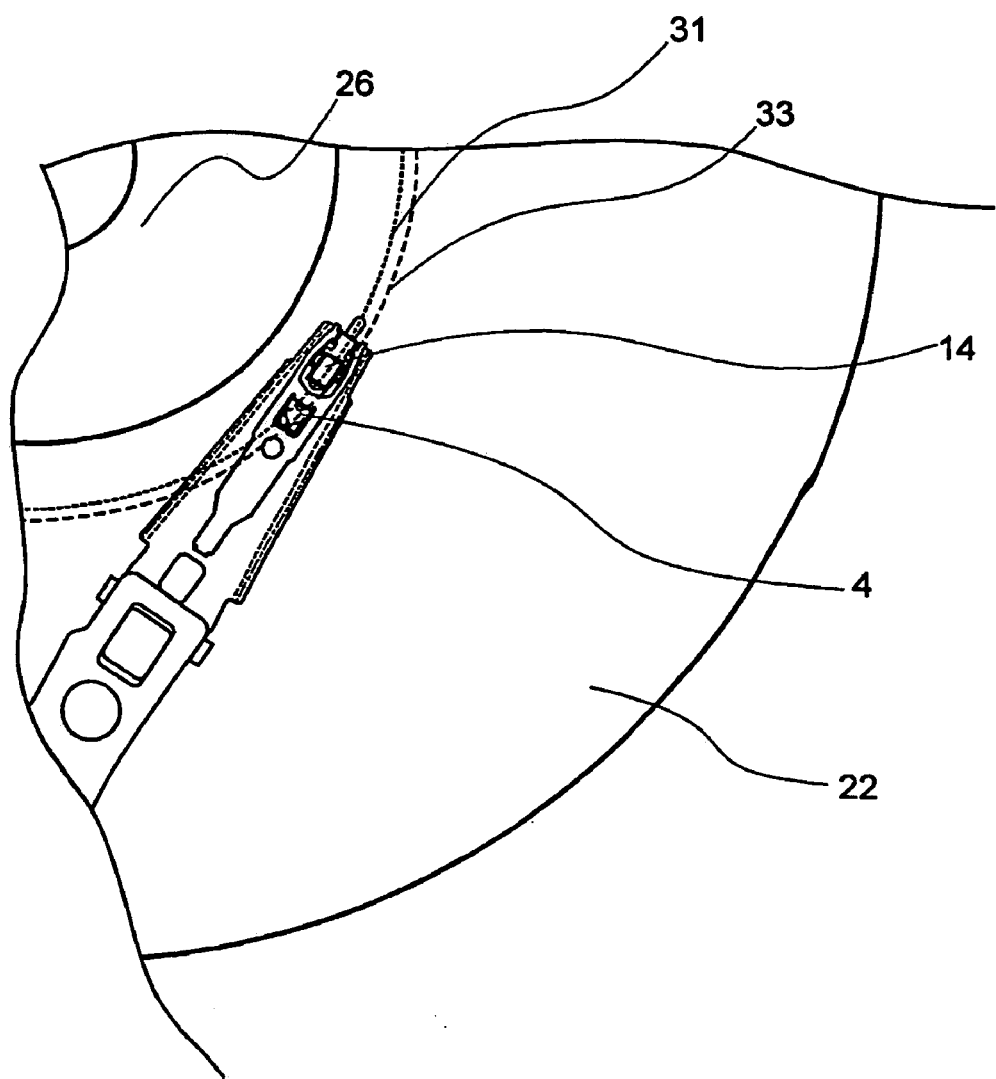
FIGS. 8A and 8B are plan views showing a comparison of an innermost periphery data track between a conventional head assembly and the head assembly of the present invention.
Figure 8B:
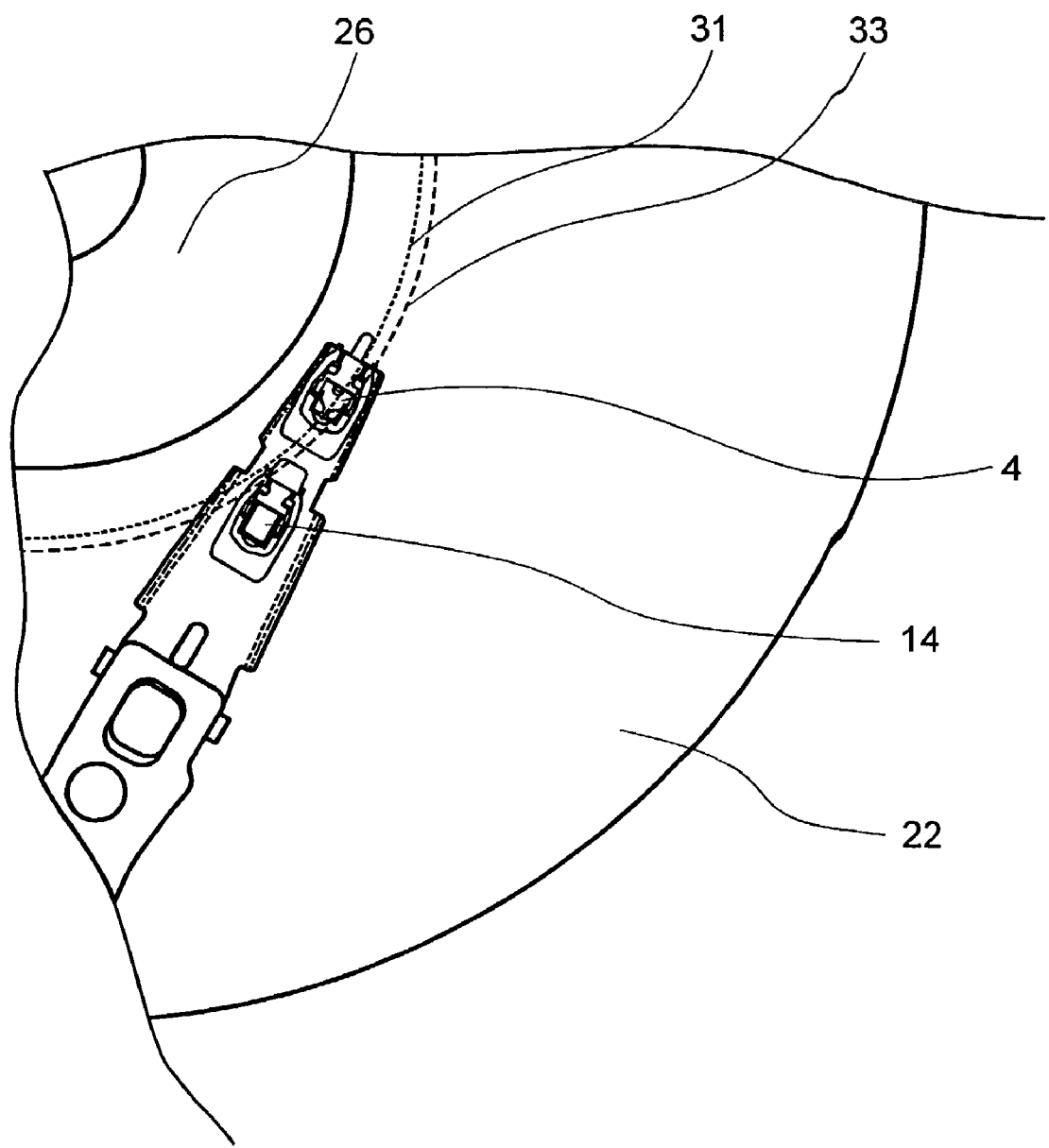

FIG. 8B shows a head assembly of the present invention. The head assembly is mounted to the magnetic disk drive and positioned over an innermost periphery data track of the magnetic disk surface 22. A transducer is mounted on slider 4 that is positioned adjacent a distal end of the head assembly for reproducing and/or recording information. Determination of the innermost data track of the magnetic disk surface 22 depends on the position of the transducer on the head assembly and the gap such that the head assembly does not interfere with a disk clamp 26. As shown by the examples in FIGS. 8A and 11, in the case of positioning a dummy slider 14 on a distal end of the head assembly and the transducer for recording or reproducing information proximal of the dummy slider 14, track 33 is the innermost track that can be accessed by the transducer since the transducer is not disposed at the distal end of the head assembly. However, in one preferred embodiment shown in FIG. 8B, when the slider 4 is arranged on the distal end of the head assembly and the dummy slider 14 is arranged proximal of the slider 4, track 31 is the innermost track that can be accessed by the transducer. Therefore, a data area of the magnetic disk 22 can be enlarged.

Figure 9A:
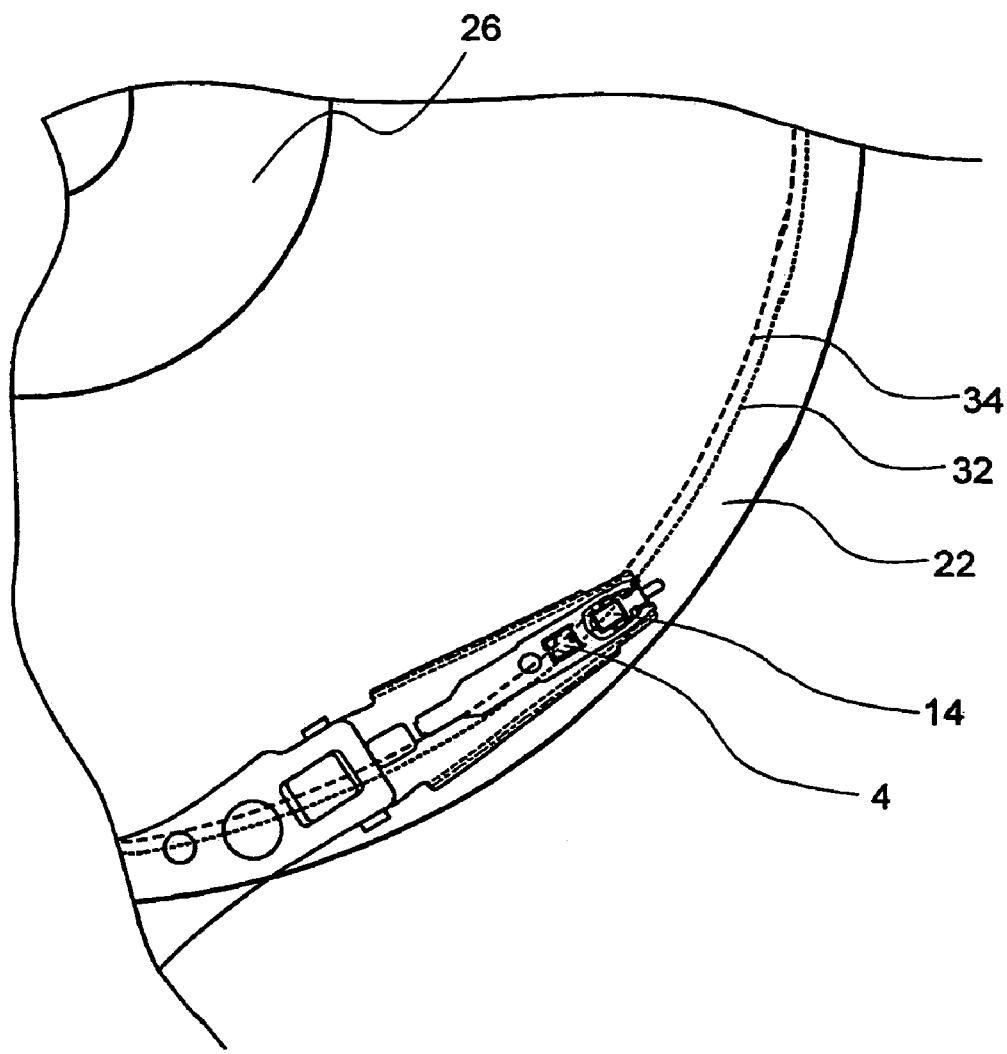
FIGS. 9A and 9B are plan views showing a comparison of an outermost periphery data track between a conventional head assembly and the head assembly of the present invention.
Figure 9B:
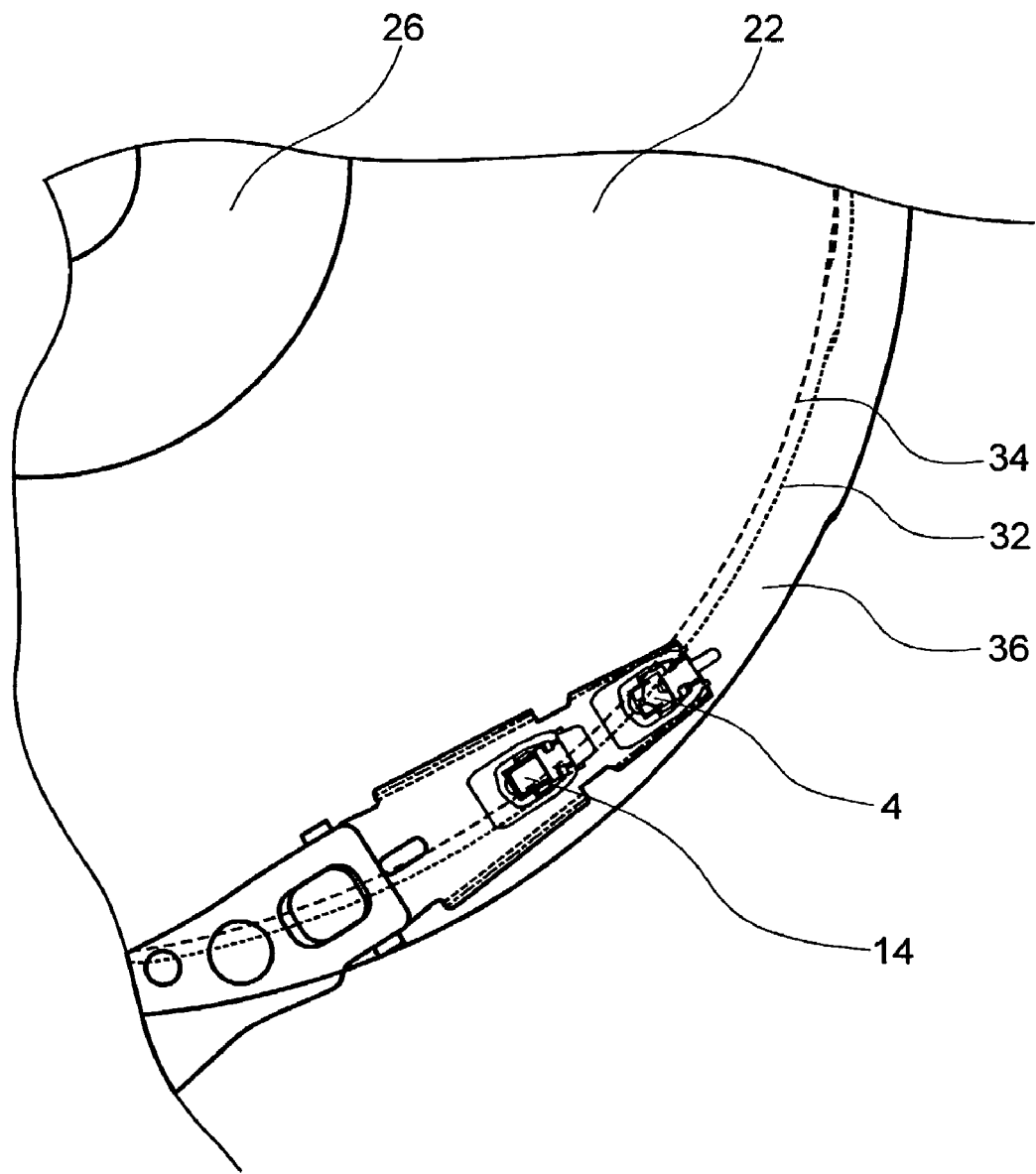
Figure 10:
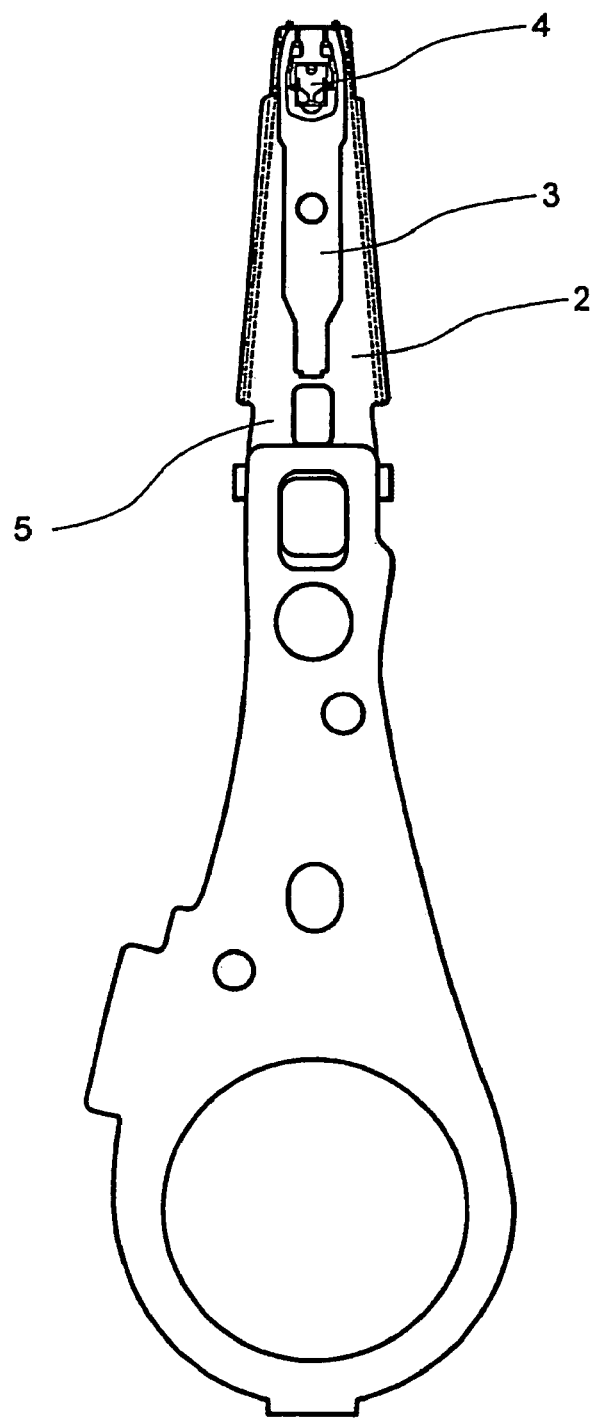
FIG. 10 is a plan view of a conventional head assembly.

FIG. 9B shows the head assembly of the present invention that is mounted to the magnetic disk drive and positioned over the outermost periphery data track of the magnetic disk surface 22. In the exemplary embodiments of the present invention, the slider 4 that has a transducer for recording or reproducing information is adjacent the distal end of the head assembly. The surface of the magnetic disk 22 includes at its outermost periphery a non-data area known as a load/unload zone 36. An inner periphery of the load/unload zone 36, becomes the outermost periphery data track 32.

As shown in FIGS. 9A and 11, the conventional head assembly has the dummy slider 14 positioned on the distal end of the head assembly and the transducer is proximal to the dummy slider 14. When the load/unload zone 36 is provided, data track 34 is the outermost data track that can be accessed by the transducer of the conventional head assembly.

In contrast, as shown in FIG. 9B, in one exemplary embodiment of the present invention, when the slider 4 is arranged on the distal end of the head assembly and the dummy slider 14 is arranged proximal of the slider 4, track 32 is the outermost data track that can be accessed by the transducer. In this way, the head assembly of the present invention allows the data area of the magnetic disk 22 to be more effectively utilized.

Figure 4A:
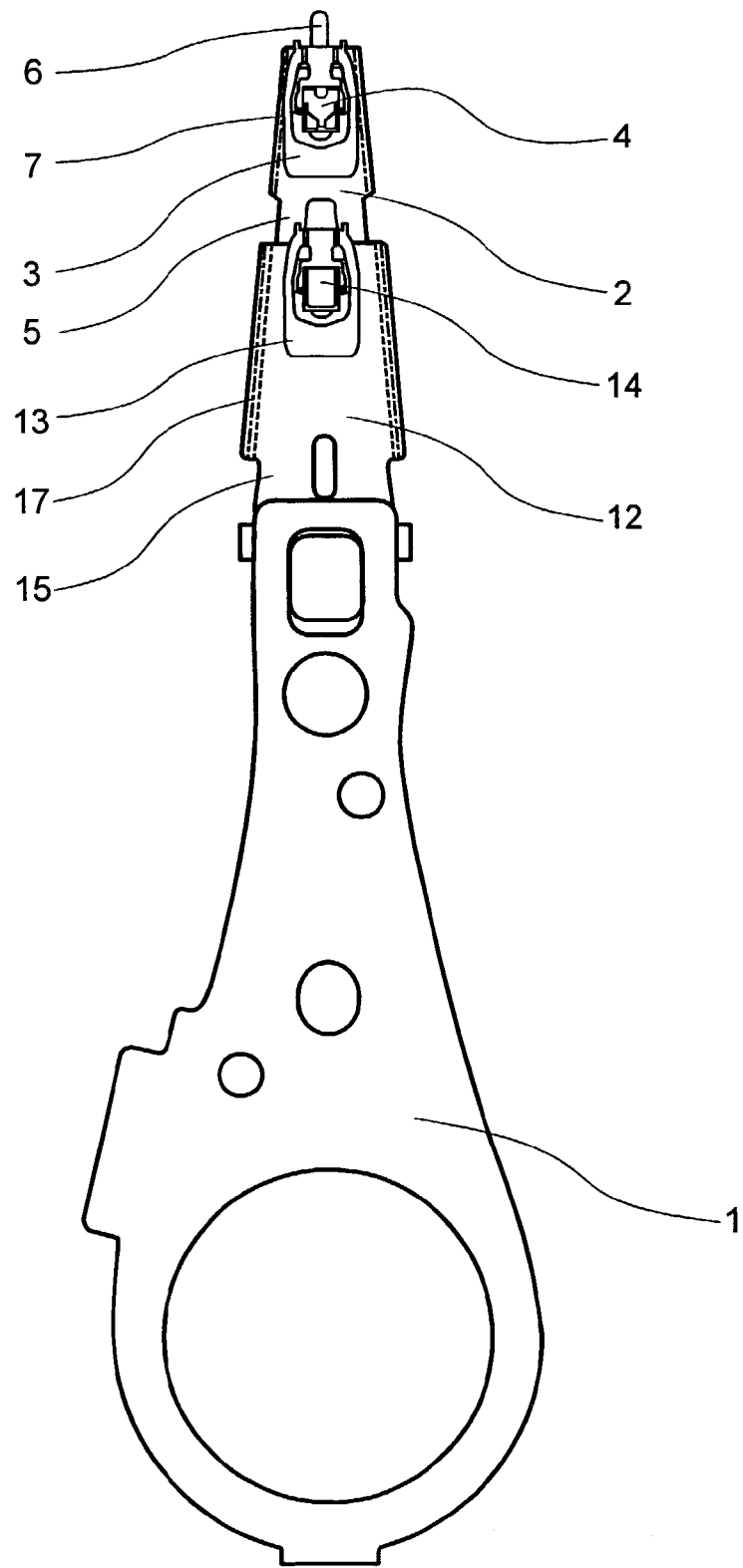
FIG. 4A is a plan view of a head assembly according to another embodiment of the invention.
Figure 4B:
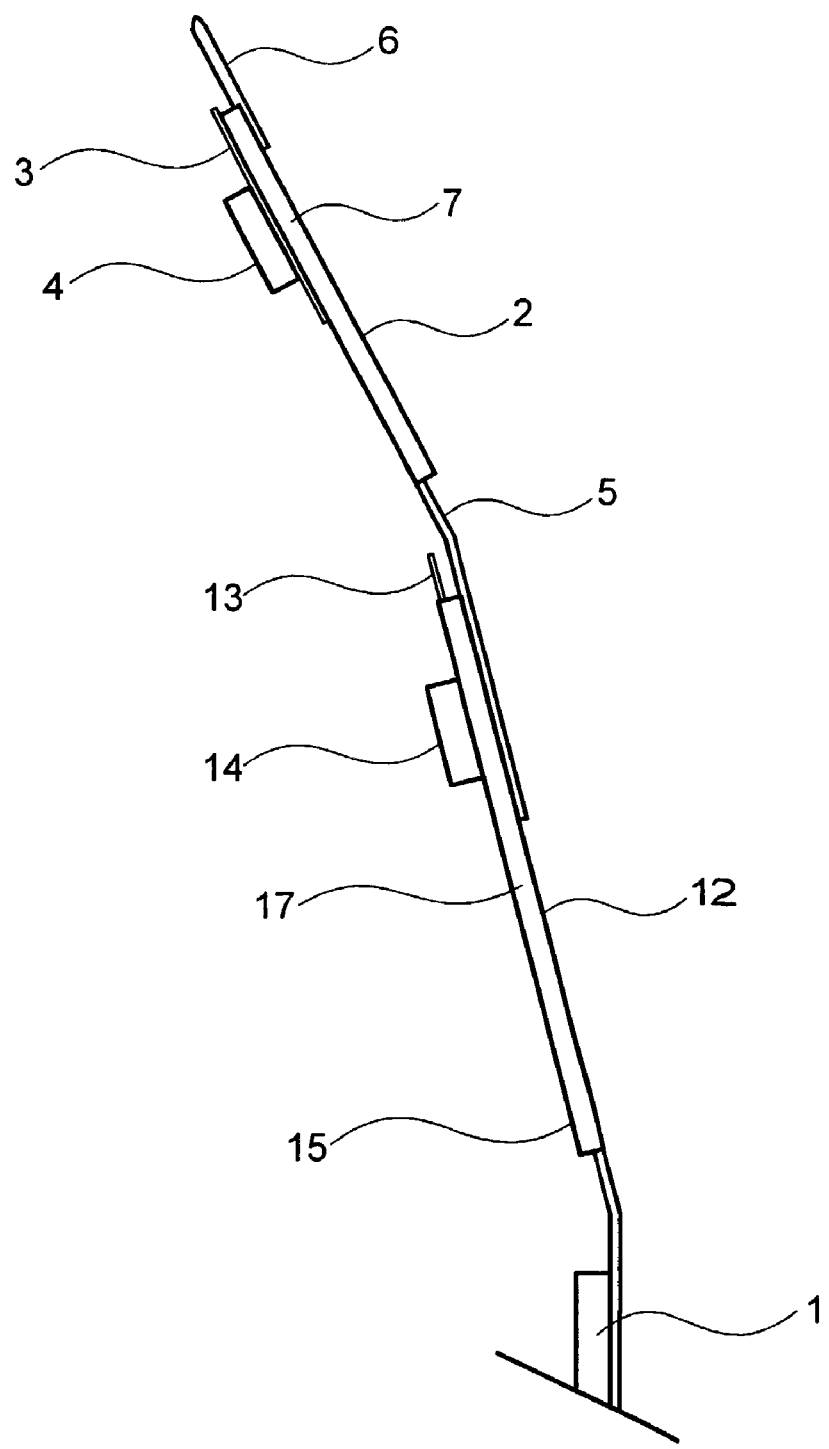
FIG. 4B is a side view of the suspension according to the invention of FIG. 4A.

FIGS. 4A and 4B show another embodiment of the present invention that has a first load beam 2 and a second load beam 12. According to the illustrated example, first load beam 2 has a formed rail or flange 7 to provide rigidity to the first load beam 2. First load beam 2 also has load bending portion 5 for applying the press load on the first slider 4. Second load beam 12 has second flange 17 to provide rigidity to the second load beam 12. Second load beam 12 also has second load bending portion 15 for applying the press load on the second slider 14. The impact resistance of the head assembly can further be improved by reducing the equivalent mass of a portion of the head assembly distal of the load bending portion 5. For example, the first load beam 2 can be made thinner than the second load beam 12 or first load beam 2 can be made of a different, lighter material.

Figure 5A:
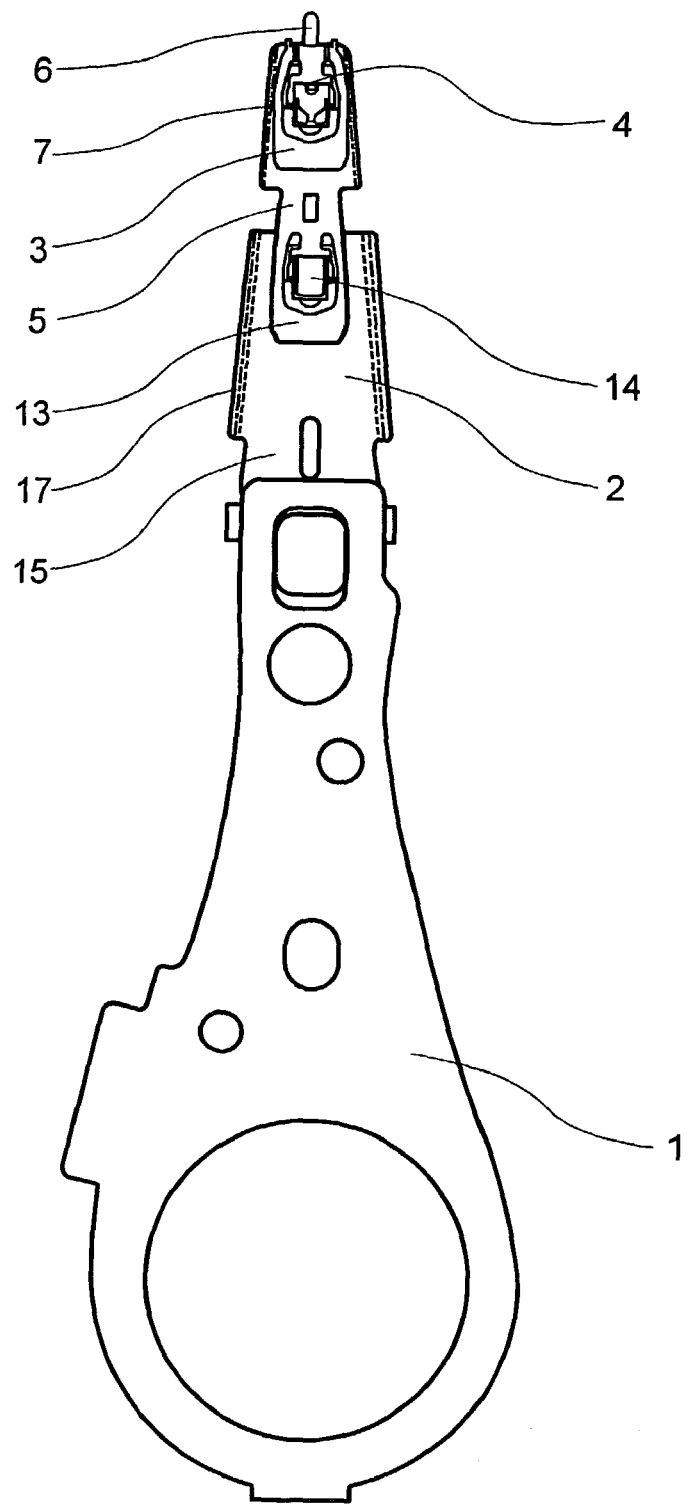
FIG. 5A is a plan view of a head assembly according to another embodiment of the invention.
Figure 5B:
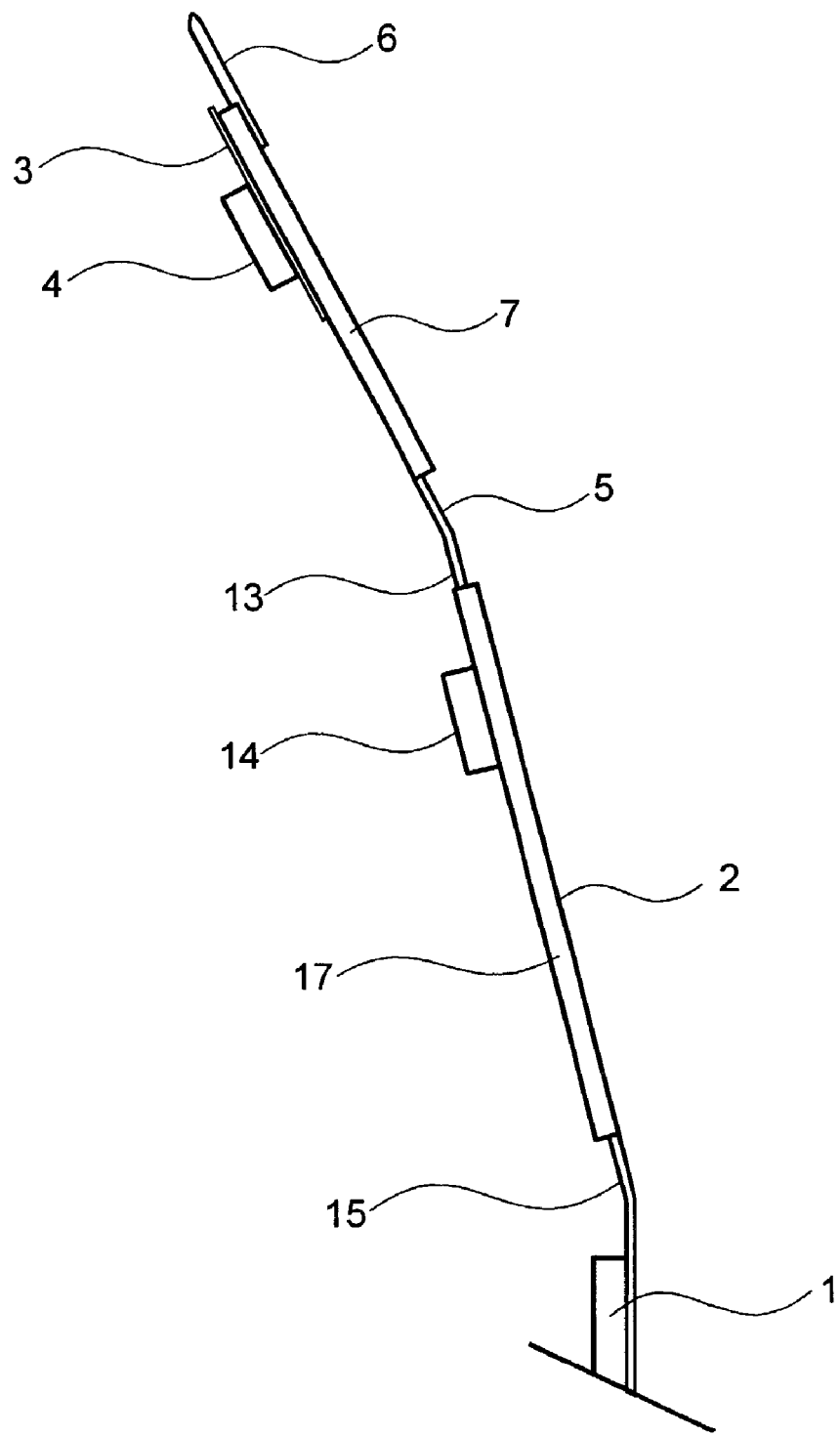
FIG. 5B is a side view of the suspension according to the invention of FIG. 5A.

FIGS. 5A and 5B show another embodiment of the present invention. According to the illustrated example, the head assembly includes a second flexure 13 for applying a press load to the first slider 4. In such embodiments, second flexure 13 has first flange 7 and load beam 2 has second flange 17. The impact resistance is promoted by reducing the dispersion in the press load of the first slider 4 and reducing the equivalent mass of the head assembly distal of the first bending portion 5.

By constructing the suspension and head assembly as shown by the above-described embodiments, the dispersion in the flying height and the atmospheric pressure dependency can be improved. Moreover, the data area of the magnetic disk can be effectively utilized. Further, an impact limit of the slider in jumping from the magnetic disk can be promoted and reliability in the impact resistance can be promoted.

While the exemplary embodiments have been described in some detail, by way of example and for clarity of understanding, a variety of modifications, adaptations, and changes will be obvious to those of skill in the art. For example, in some embodiments, the head assembly may have only one slider that carries the transducer. Therefore, the scope of the present invention is limited solely by the appended claims.

What is claimed is:

1. A suspension comprising:
    an arm configured to be held by a positioning mechanism;
    a first load beam which is coupled to the arm;
    a first flexure coupled to the first load beam;
    a first load bending portion and a second load bending portion between the arm and the first flexure; and
    a second flexure located between the first load bending portion and the second load bending portion.

2. The suspension according to claim 1 further comprising a first gimbal which is part of the first flexure and coupleable to a first slider and a second gimbal which is part of the second flexure and is coupleable to a second slider, wherein a gimbal rigidity of the first flexure is less rigid than a gimbal rigidity of the second flexure.

3. The suspension according to claim 1 wherein the first bending portion defines a first angle and the second bending portion defines a second angle, wherein the first angle is different from the second angle.

4. The suspension according to claim 3 further comprising a gimbal which is part of the first flexure and is configured to maintain a slider, wherein the first and second angle are measured on the gimbal side, wherein the second angle is larger than the first angle.

5. A head assembly comprising:
    an arm configured to be held by a positioning mechanism;
    a first load beam which is coupled to the arm;
    a first slider having a transducer that reproduces information from a medium, the first slider being coupled to the first load beam; and
    a second slider positioned between the first slider and the positioning mechanism, wherein the head assembly comprises a first load bending portion and a second load bending portion, wherein the first load bending portion and the second load bending portion are between the arm and the first slider; and
    a first flexure and a second flexure, wherein the first slider is positioned on the first flexure and the second slider is positioned on the second flexure.

6. A head assembly comprising:
    an arm configured to be held by a positioning mechanism;
    a first load beam which is coupled to the arm;
    a first slider having a transducer that reproduces information from a medium, the first slider being coupled to the first load beam;
    a second slider positioned between the first slider and the positioning mechanism, wherein the head assembly comprises a first load bending portion and a second load bending portion, wherein the first load bending portion and the second load bending portion are between the arm and the first slider; and
    a first flexure and a second flexure, wherein the first slider is positioned on the first flexure and the second slider is positioned on the second flexure,
    wherein the first bending portion defines a first angle and the second bending portion defines a second angle, wherein the first angle is different from the second angle.

7. A head assembly comprising:
    an arm configured to be held by a positioning mechanism;
    a first load beam which is coupled to the arm;
    a first slider having a transducer that reproduces information from a medium, the first slider being coupled to the first load beam;
    a second slider positioned between the first slider and the positioning mechanism, wherein the head assembly comprises a first load bending portion and a second load bending portion, wherein the first load bending portion and the second load bending portion are between the arm and the first slider;
    a first flexure and a second flexure, wherein the first slider is positioned on the first flexure and the second slider is positioned on the second flexure, wherein the first bending portion defines a first angle and the second bending portion defines a second angle, wherein the first angle is different from the second angle; and
    a gimbal which is part of the first flexure and is configured to maintain the first slider, wherein the first and second angle are measured on the gimbal side of the head assembly, wherein the second angle is larger than the first angle.

* * * * *